(12) United States Patent
Fujishima et al.

(10) Patent No.: US 8,081,867 B2
(45) Date of Patent: *Dec. 20, 2011

(54) RECORD/PLAYBACK APPARATUS (75) Inventors: Yoshikazu Fujishima, Daito (JP); Ryusuke Noda, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1183 days.

This patent is subject to a terminal disclaimer.

(21) Appl. No.: 11/497,346

(22) Filed: Aug. 2, 2006

(65) Prior Publication Data

US 2007/0031120 A1 Feb. 8, 2007

(30) Foreign Application Priority Data

Aug. 2, 2005 (JP) ................................. 2005-224366

(51) Int. Cl.
*H04N 9/80* (2006.01)
(52) U.S. Cl. ........... 386/249; 386/250; 386/251; 725/32
(58) Field of Classification Search .................... 386/95, 386/46, 80, 45, 108, 124–126, 68, 6–7, 69
See application file for complete search history.

(56) References Cited

U.S. PATENT DOCUMENTS

| 5,488,409 | A | * | 1/1996 | Yuen et al. | 725/41 |
| 5,740,549 | A | * | 4/1998 | Reilly et al. | 705/14.42 |
| 2002/0150380 | A1 | * | 10/2002 | Shigetomi et al. | 386/46 |
| 2002/0174439 | A1 | * | 11/2002 | Akiyama et al. | 725/100 |
| 2005/0002644 | A1 | * | 1/2005 | Nakamura et al. | 386/52 |
| 2006/0013557 | A1 | * | 1/2006 | Poslinski | 386/46 |
| 2007/0031118 | A1 | * | 2/2007 | Fujishima et al. | 386/95 |

FOREIGN PATENT DOCUMENTS

| JP | 2002-142196 A | 5/2002 |
| JP | 2002-374495 A | 12/2002 |
| JP | 2003-110980 | 4/2003 |

* cited by examiner

*Primary Examiner* — Helen Shibru
(74) *Attorney, Agent, or Firm* — Pillsbury Winthrop Shaw Pittman, LLP (57) ABSTRACT

A record/playback apparatus includes a recording unit that records a televised program being received by a receiving unit to a disk-shaped recording medium such as a DVD or HD. Also, a commercial message detecting unit detects a switch from main program to commercial message and a switch from commercial message to main program. The recording unit records the main program and commercial messages inserted in the main program to the recording medium under separate titles, based on a result of the detection by the commercial message detecting unit.

1 Claim, 5 Drawing Sheets

PLEASE SELECT A PROGRAM FOR PLAYBACK

PLEASE SELECT A PLAYBACK METHOD

1. PLAY MAIN PROGRAM ONLY
2. PLAY WITH CMS INSERTED
3. PLAY CMS ONLY
4. PLAY SPECIFIED TITLE ONLY

FIG. 5C

PLEASE SPECIFY A TITLE NAME FOR PLAYBACK

1. AAA-MAIN1
2. AAA-CM1
3. AAA-MAIN2
4. AAA-CM2
5. AAA-MAIN3
6. AAA-CM3
7. AAA-MAIN4

RECORD/PLAYBACK APPARATUS

CROSS REFERENCE

This Nonprovisional application claims priority under 35 U.S.C. §119(a) on Patent Application No. 2005-224366 filed in Japan on Aug. 2, 2005, the entire contents of which are hereby incorporated by reference.

BACKGROUND OF THE INVENTION

The present invention relates to a record/playback apparatus that records a televised program to a disk-shaped recording medium such as a DVD or a HD, and plays the program recorded on the recording medium.

Conventionally, record/playback apparatuses that receive televised programs and record the received programs to disk-shaped recording media such as DVD (digital versatile disk) or HD (hard disk), and that play programs recorded on recording media are in widespread use. There are also record/playback apparatuses capable of recording programs to both DVD and HD, and playing recorded programs. Most television stations insert commercial messages (hereinafter, "CMs") in the main program. Conventional record/playback apparatuses, when recording a televised program to a recording medium, were configured to record the program to the recording medium as a single program, without distinguishing between the main program and CMs inserted in the main program.

In order to improve the usability of fast-forwarding CM portions, given that the majority of users who watch programs recorded on recording media will fast-forward these portions (portions in which CMs are recorded) when the playback position reaches CMs inserted in the main program, a record/playback apparatus has been proposed that is configured to detect CMs inserted in the main program during playback, and play the main program while automatically skipping the CMs. A record/playback apparatus has also been proposed that is configured to record only the main program to a recording medium when recording a televised program, without recording CMs inserted in the main program to the recording medium.

The above record/playback apparatuses are based on the idea that CMs inserted in the main program are of no value to the user and that the user will not watch the CMs. On the other hand, television stations that broadcast programs insert CMs in the main program in order to cover expenses such as program production costs and the like. Specifically, the CMs of sponsors are inserted in the main program and broadcast in exchange for making the sponsors bear expenses such as program production costs and the like. Sponsors bear expenses such as program production costs and the like in return for the advertising effect resulting from broadcasting CMs. Consequently, the sponsors want as many people as possible to watch the CMs in order to increase the advertising effect. Television stations similarly want as many people as possible to watch CMs, since sponsors reduce their cost burden related to CM broadcasts when the number of people watching CMs drops. In view of this, JP 2003-110980A proposes a system for suppressing the number of users who skip CMs during playback of recorded programs and getting a greater number of users to watch CMs, by inserting CMs in the main program that are of types and fields desired by the user.

However, while conventional apparatuses, in terms of usability, were able to playback a recorded program without the CMs, that is, continuously play just the main program, they were not able to continuously play just the CMs inserted in the main program. Thus, the user was not able to continuously watch just the CMs inserted in a recorded program. This factor contributed to the drop in users who watch CMs inserted in the main program. For example, even if the user only wanted to watch the CMs inserted in the main program for a change, he or she was not able to continuously play and watch just the CMs inserted in the main program.

An object of the present invention is to provide a record/playback apparatus that is not only able to continuously play just the main program of a recorded program, but can also continuously play just the CMs inserted in the main program, and thus get a greater number of users to watch the CMs inserted in the main program without reducing usability.

SUMMARY OF THE INVENTION

A record/playback apparatus according to the present invention includes a recording unit that records a televised program being received by a receiving unit to a disk-shaped recording medium such as a DVD (digital versatile disk) or HD (hard disk). The record/playback apparatus further includes a commercial message detecting unit that detects a switch from main program to commercial message and a switch from commercial message to main program when the recording unit is recording the program. This commercial message detecting unit may, for example, be configured to judge that the main program is being received in the case of a preset audio mode, and that a commercial message is being received in the case of other audio modes, or to distinguish a commercial message from the main program based on changes in the audio level, or to measure the time period for which the audio mode is constant, and distinguish a commercial message from the main program based on this time period. The recording unit records the main program and commercial messages inserted in the main program to the recording medium under separate titles, based on a result of the detection by the commercial message detecting unit. Consequently, the main program and commercial messages in a recording sequence are recorded to the recording medium under separate titles.

Thus, it is possible to play just the main program, or to play just the commercial messages inserted in the main program. For example, when the user only wants to watch the CMs inserted in the main program for a change, he or she is able to continuously play and watch just the CMs inserted in the main program. Again, when the user wants to skip the CMs inserted in the main program, he or she can also play just the main program. Consequently, it is possible to get a greater number of users to watch CMs inserted in the main program without reducing usability.

The record/playback apparatus may be configured to record a plurality of temporally consecutive commercial messages inserted in the main program to a recording medium under the same title name. In this case, an increase in the number of titles recorded on the recording medium is suppressed. Increasing the user's workload related to managing titles recorded on the recording medium and reducing usability can thus be prevented.

DETAILED DESCRIPTION OF THE INVENTION

Figure 1:
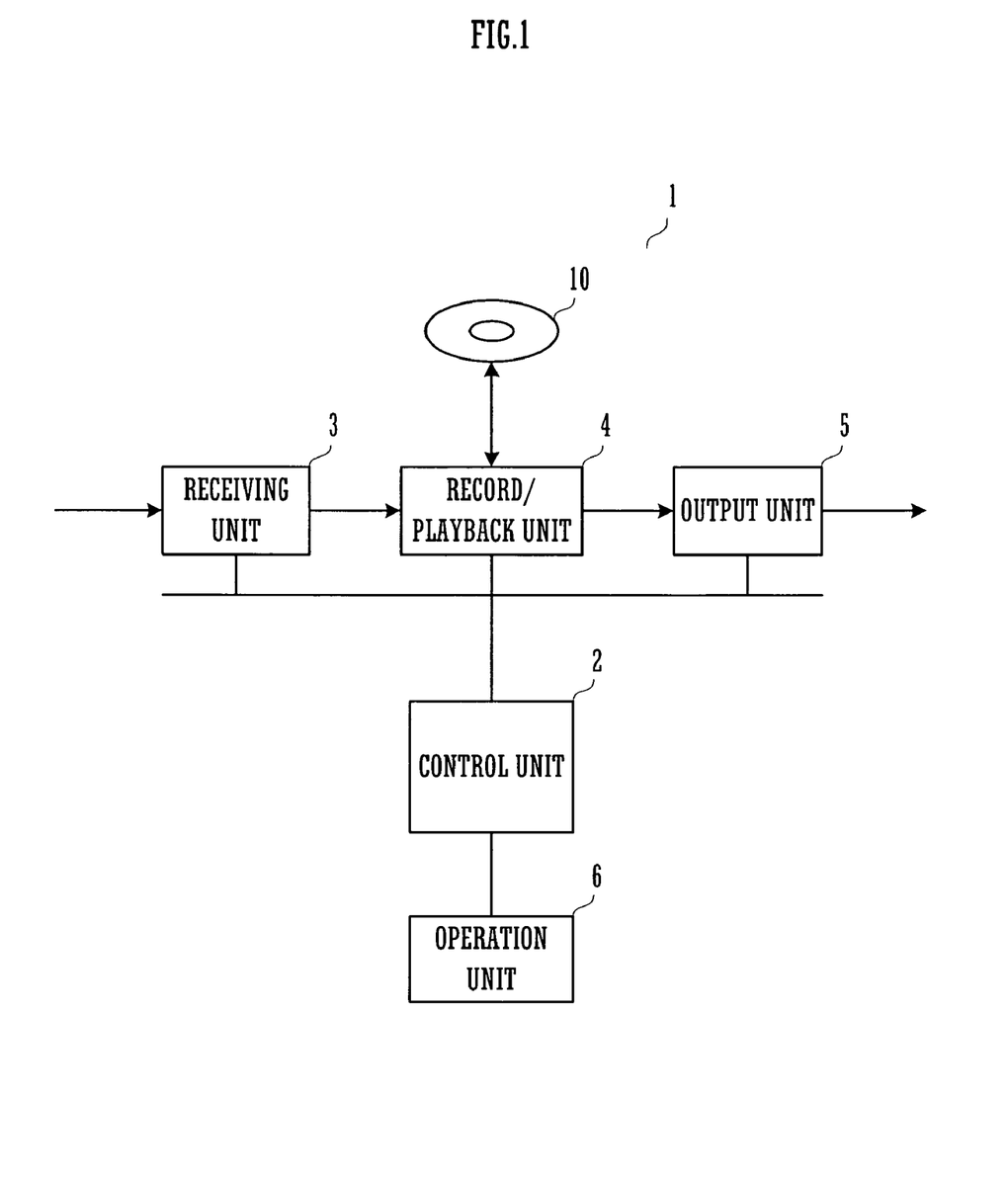
FIG. 1 is a block diagram showing the configuration of a main part of a record/playback apparatus according to an embodiment of the present invention.

FIG. 1 is a block diagram showing the configuration of a main part of a record/playback apparatus according to an embodiment of the present invention. A record/playback apparatus 1 of the present embodiment includes a control unit 2 that controls the operation of the record/playback apparatus, and a receiving unit 3 that receives the broadcast wave of a television broadcast. The record/playback apparatus 1 also includes a record/playback unit 4 that records video and audio resulting from the broadcast wave received by the receiving unit 3 to a DVD 10 (digital versatile disk), as well as reading data recorded on the DVD 10 (recorded data) and playing the read data, and an output unit 5 that outputs a playback signal played by the record/playback unit 4. The record/playback apparatus 1 further includes an operation unit 6 for performing input operations.

The receiving unit 3 has a publicly known tuner for extracting a broadcast wave (television broadcast signal) on a selected channel. This television broadcast signal includes the video signal and audio signal of a program or commercial message (hereinafter, "CM") that is being broadcast. The receiving unit 3 separates the video and audio signals from the television broadcast signal on the selected channel, and inputs the video and audio signals to the record/playback unit 4. The record/playback unit 4 encodes the video and audio signals input from the receiving unit 3 to obtain a video stream and an audio stream. The record/playback unit 4 then obtains a system stream in which the video and audio streams have been packetized into prescribed units and multiplexed. The video and audio signals are encoded using MPEG, for example. The record/playback unit 4 records this system stream to the DVD 10. The record/playback unit 4 has a pickup head for irradiating a laser beam onto the DVD 10, and controls the laser beam irradiated onto the DVD 10 by the pickup head based on the multiplexed system stream. Thus, video and audio received by the receiving unit 3 are recorded to the DVD 10. The record/playback unit 4 also performs reading that involves irradiating a laser beam of lower power than for recording onto the DVD 10, and detecting the reflected light as the system stream of video and audio constituting a program recorded on the DVD 10. Further, the record/playback unit 4 separates the system stream read from the DVD 10 into a video stream and an audio stream, as well as decoding the video and audio streams and outputting video and audio. The output unit 5 converts the video and audio decoded by the record/playback unit 4 into signals compatible with a display apparatus (not shown) and a speaker (not shown) that are connected to the output unit 5, and outputs the signals.

The operation unit 6 has operation keys provided on the record/playback apparatus 1, and a remote control receiving unit for receiving control signals transmitted to the record/playback apparatus 1 from a remote control apparatus not shown in the drawings. The DVD 10 for recording the program received by the receiving unit 3 is detachable from the record/playback apparatus 1.

Note that the record/playback apparatus 1 of the present embodiment is also able to record a program to the DVD 10 using a well-known timer recording function. The setting of timer recording information related to timer recording such as timer recording start and end times can be performed with the operation unit 6 or the remote control apparatus. The record/playback apparatus 1 also has a one touch recording function for recording a program or CM that is broadcast on a channel being received by the receiving unit 3 at that time to the DVD 10, as a result of the user performing a prescribed input operation (operation of a record key). Further, the record/playback apparatus 1 of the present embodiment has an OSD function for displaying an operation assistance screen on the display apparatus connected to the output unit 5, although this is not shown in FIG. 1.

Most television stations broadcast programs with the CMs of sponsors inserted in the main program. The audio signal of a television broadcast includes information showing the audio mode as being a stereo broadcast, a bilingual broadcast, a monaural broadcast, or the like. The record/playback apparatus 1 of the present embodiment has a function (equates to the "commercial message detecting unit" of the present invention) for detecting whether a television broadcast signal received by the receiving unit 3 is the main program or a CM, based on changes in the received audio signal. For example, this function detects a television broadcast signal whose audio mode is the preset audio mode as being the main program and other television broadcast signals as being CMs. Information showing the audio mode is included in the audio signal of a television broadcast, as noted above. Consequently, the record/playback apparatus 1 is able to detect the audio mode of an audio signal being received by the receiving unit 3 by reading this information.

Alternatively, utilizing the fact that silent intervals exist between the main program and CMs as well as between individual CMs, the record/playback apparatus 1 may be configured to detect CMs by detecting changes in the audio level; that is, by detecting silent intervals. Further, given that the broadcast time period of CMs is shorter than the continuous broadcast time period of the main program, the record/playback apparatus 1 may be configured to measure changes in the audio mode and the time period that the audio mode remains constant (unchanged), and detect CMs based on this information.

Note that the record/playback apparatus 1 may be configured combining any of the above configurations so as to detect whether a television broadcast signal being received by the receiving unit 3 is the main program or a CM.

Figure 2A:
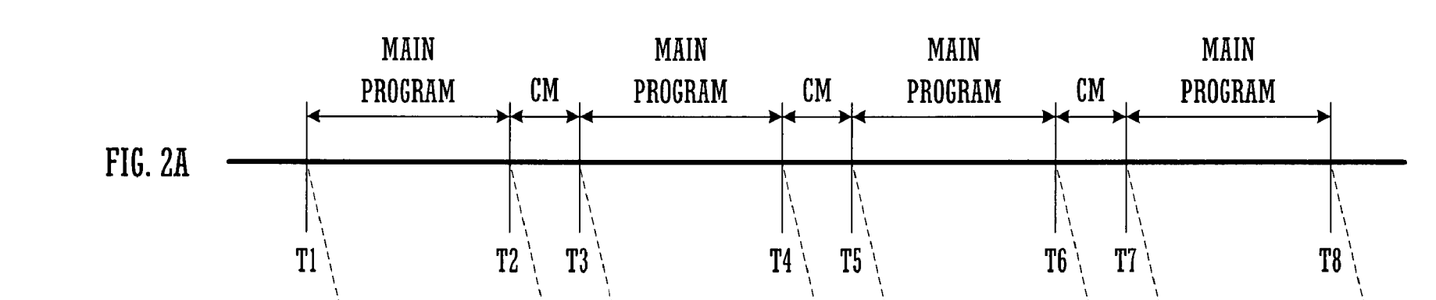
FIGS. 2A and 2B illustrate a method of recording a program to a DVD in a record/playback apparatus according to an embodiment of the present invention.
Figure 2B:
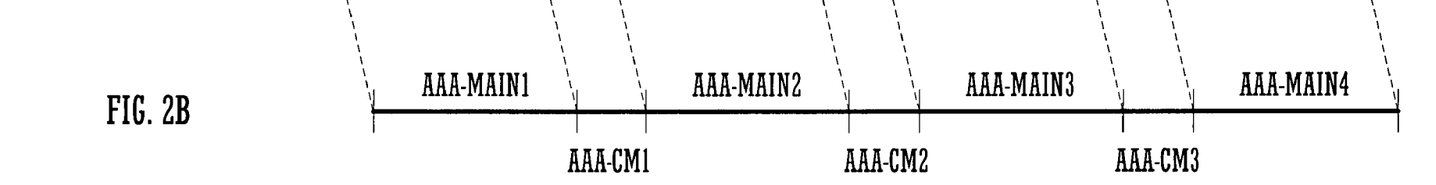

The record/playback apparatus 1 of the present embodiment, in recording a program, records the main program and CMs inserted in the main program to the DVD 10 under separate titles. With the DVD 10, a single title is recorded in consecutive addresses. Thus, when recording a program sequence having CMs inserted in the main program to the DVD 10, as shown in FIG. 2A, the record/playback apparatus 1 records the program sequence to the DVD 10 with different titles attached to consecutive intervals of the main program and consecutive intervals of CMs, as shown in FIG. 2B. FIG. 2A shows a television broadcast signal, and FIG. 2B shows the recording area of the DVD. To be more specific, T1 shown in FIG. 2A is the recording start timing, T2-T3, T4-T5, and T6-T7 are the broadcast time periods of CMs inserted in the main program, and T8 is the recording end timing. T1-T2, T3-T4, T5-T6, and T7-T8 are the broadcast time periods of the main program. There may be one or a plurality of CMs broadcast in each of the intervals T2-T3, T4-T5, and T6-T7.

The record/playback apparatus 1 records the program to the DVD 10 with individual titles attached to the seven intervals T1-T2, T2-T3, T3-T4, T4-T5, T5-T6, T6-T7, and T7-T8. Related title names are attached so that the intervals are recognized as belonging to the same program sequence. For example, the main title of the program to be recorded is decided in advance. If the main title is "AAA", for example, the interval T1-T2 is recorded to the DVD 10 under the title name "AAA-main1", the interval T3-T4 is recorded to the DVD 10 under the title name "AAA-main2", the interval T5-T6 is recorded to the DVD 10 under the title name "AAA-main3", and the interval T7-T8 is recorded to the DVD 10 under the title name "AAA-main4". Further, the interval T2-T3 is recorded to the DVD 10 under the title name "AAA-CM1", the interval T4-T5 is recorded to the DVD 10 under the title name "AAA-CM2", and the interval T6-T7 is recorded to the DVD 10 under the title name "AAA-CM3". In this way, the record/playback apparatus 1 of the present embodiment, in recording a program sequence, not only records the main program and CMs inserted in the main program to the DVD 10 under separate titles, but attaches title names associated with the main title to the various intervals, thereby making it possible to determine the relationship between titles recorded on the DVD 10 from the title names. In other words, it is possible to determine that titles having the same main title belong to the same program sequence.

Note that the main title of a program to be recorded, which is "AAA" in the above example, may be input by the user, or may be acquired using an EPG or the like, or may be the recording date and time, for example.

In this way, seven titles are recorded to the DVD 10, as shown in FIG. 2B, when the record/playback apparatus 1 of the present embodiment records the televised program shown in FIG. 2A to the DVD 10. These titles are recorded consecutively to the recording area of the DVD 10.

Further, the record/playback apparatus 1 of the present embodiment, when playing a recorded program sequence as shown in FIG. 2B, is able to continuously play just the main program, or play the main program with the CMs inserted therein (same format as a television broadcast). The record/playback apparatus 1 is also able to play just the CMs, or play any one of the titles.

Figure 3:
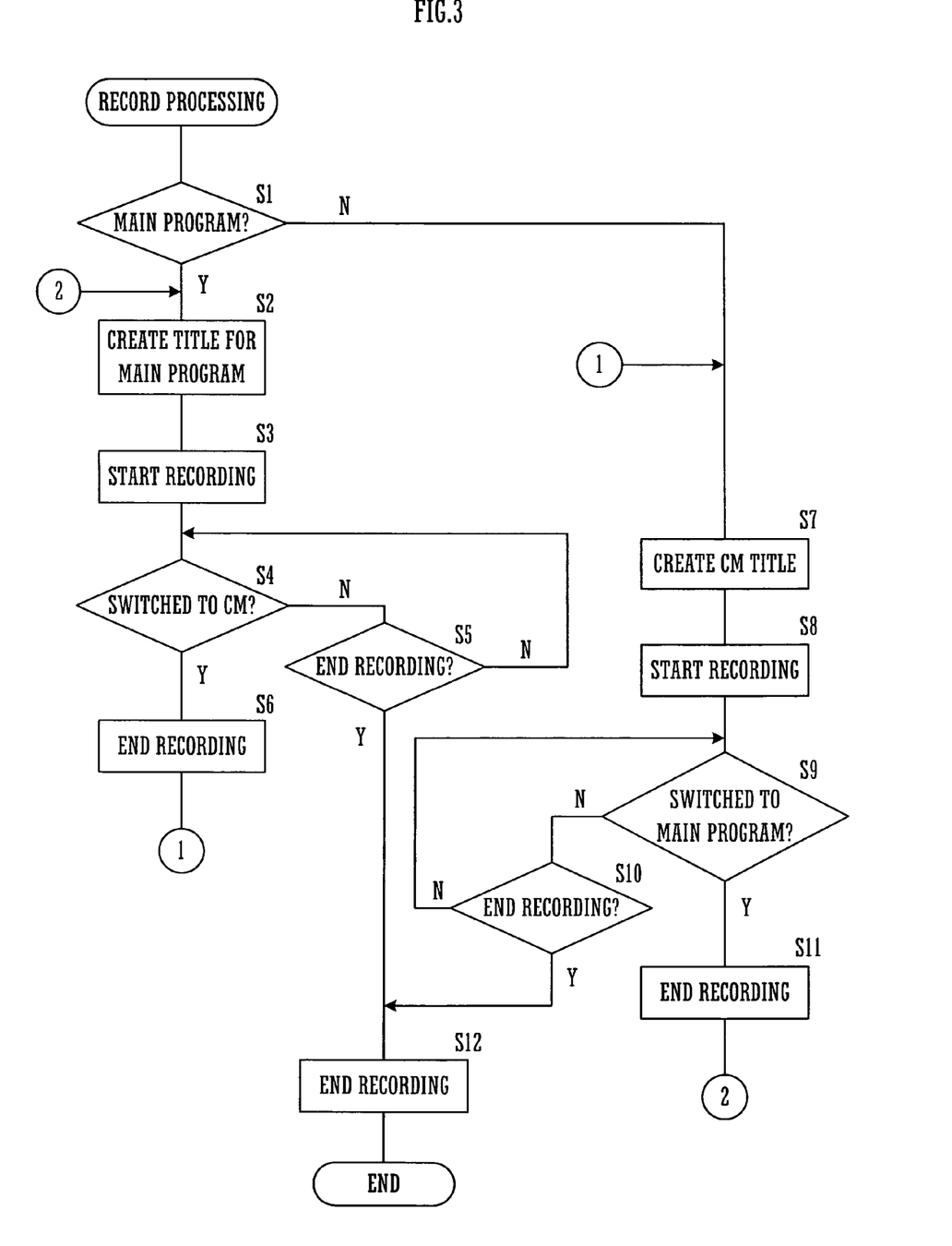
FIG. 3 is a flowchart showing record processing in a record/playback apparatus according to an embodiment of the present invention.

Record processing in the record/playback apparatus 1 of the present embodiment is described next. FIG. 3 is a flowchart showing record processing in the record/playback apparatus 1 of the present embodiment. This record processing is started when the recording start time of a program preset for recording arrives or when the record key of either the operation unit 6 or the remote control apparatus is operated. The receiving unit 3 of the record/playback apparatus 1 receives a broadcast wave on a specified channel at this time. The specified channel is a channel preset for recording in the case of recording using the timer recording function, and is a channel received by the receiving unit 3 at that time in the case of recording that results from operation of the record key.

The record/playback apparatus 1 judges whether the television broadcast signal of the channel being received by the receiving unit 3 is the main program or a CM (S1). At S1, the record/playback apparatus 1 judges whether the main program is being received or whether a CM is being received, based on the audio signal of the television broadcast signal being received by the receiving unit 3 at this time. Specifically, the record/playback apparatus 1 judges that the main program is being received if the audio mode of the television broadcast signal being received by the receiving unit 3 is the audio mode preset for the main program, and conversely that a CM is being received if the audio mode of the television broadcast signal is different from the audio mode preset for the main program. The record/playback apparatus 1, having judged at S1 that the main program is being received, generates a title corresponding to the main program to be recorded (S2), and starts recording the program based on the television broadcast signal being received by the receiving unit 3 (S3). At S2, the record/playback apparatus 1 creates a title name that includes the main title of the program to be recorded and the serial number of the main program. As noted above, the main title of the program to be recorded may be preset by the user or may be information showing the recording date and time, for instance. The main program with respect to which recording was started at S3 is recorded to the DVD 10 under the title name generated at S2. At S3, the receiving unit 3 separates the television broadcast signal on the channel being received into a video signal and an audio signal, and inputs the video and audio signals to the record/playback unit 4. The record/playback unit 4 encodes the video and audio signals input from the receiving unit 3 to obtain a video stream and an audio stream. The record/playback unit 4 then starts processing for recording a system stream to the DVD 10 in which the video and audio streams have been packetized into prescribed units and multiplexed. Description of the recording of a system stream to the DVD 10 is omitted here. The record/playback apparatus 1 performs publicly known OCP prior to recording the program to the DVD 10, and obtains the optimum power of the laser beam for irradiating onto the DVD 10 during recording.

The record/playback apparatus. 1, having started recording the program at S3, waits until the television broadcast signal being received by the receiving unit 3 has switched from main program to CM (S4), or waits for the recording end timing to arrive (S5). At S4, the record/playback apparatus 1 judges that there has been a switch from main program to CM when there is a change in the audio mode of the television broadcast signal being received by the receiving unit 3; that is, when the audio mode of the television broadcast signal being received by the receiving unit 3 changes to a different audio mode from the audio mode preset for the main program. At S5, the record/playback apparatus 1 judges that the recording end timing has arrived when the preset recording end time of the program arrives, during recording that results from timer recording. The record/playback apparatus 1 also judges at S5 that the recording end timing has arrived when a recording end key of either the operation unit 6 or the remote control apparatus is operated.

The record/playback apparatus 1, having judged at S4 that there has been a switch from main program to CM, ends the recording of the main program to the DVD 10 under the title name created at S2 (S6), and proceeds to S7. The record/playback apparatus 1 having judged at S1 that a CM rather than the main program is being received, or that the processing related to S6 is complete, generates a title corresponding to the CM to be recorded (S7), and starts recording the CM based on the television broadcast signal being received by the receiving unit 3 (S8). At S7, the record/playback apparatus 1 creates a title name that includes the main title of the program being recorded and the serial number of the CM. As noted above, the main title of the program may be preset by the user, or may be information showing the recording date and time, for instance. The CM with respect to which recording was started at S8 is recorded to the DVD 10 under the title name generated at S7. At S8, the receiving unit 3 separates the television broadcast signal being received into a video signal and an audio signal, and inputs the video and audio signals to the record/playback unit 4, similarly to S3. The record/playback unit 4 encodes the video and audio signals input from the receiving unit 3 to obtain a video stream and an audio stream. The record/playback unit 4 then starts processing for recording a system stream in which the video and audio streams have been packetized into prescribed units to the DVD 10.

The record/playback apparatus 1, having started recording a CM at S3, waits until the television broadcast signal being received by the receiving unit 3 has switched from CM to main program (S9), or waits for the recording end timing to arrive (S10). At S9, the record/playback apparatus 1 judges that there has been a switch from CM to main program when the audio mode of the television broadcast signal being received by the receiving unit 3 has changed to the audio mode preset for the main program; that is, when the audio mode of the television broadcast signal being received by the receiving unit 3 is the audio mode preset for the main program. At S10, the record/playback apparatus 1 judges, similarly to S5, that the recording end timing has arrived when the preset recording end time of the program arrives, during recording that results from timer recording. The record/playback apparatus 1 also judges at S10 that the recording end timing has arrived when the recording end key of either the operation unit 6 or the remote control apparatus is operated. The record/playback apparatus 1, having judged at S9 that the television broadcast signal being received by the receiving unit 3 has switched from CM to main program, ends the recording of CMs to the DVD 10 under the title name created at S7 (S11), returns to S2, and repeats the above processing.

In this way, the record/playback apparatus 1, in recording a program sequence, records the main program and CMs inserted in the main program to the DVD 10 under different title names. Even with a program sequence recorded to the DVD 10 after having been divided into a plurality of titles, it is possible to easily determine the relationship between the titles from the title names, since each title name includes the main title and a serial number indicating either main program or CM.

The record/playback apparatus 1, having judged at S5 or S10 that the recording end timing has arrived, ends the recording of the current program sequence (S12), and ends the processing. Thus, seven titles are recorded to the DVD 10 as shown in FIG. 2B, when the record/playback apparatus 1 records the televised program shown in FIG. 2A to the DVD 10, for example.

Figure 4:
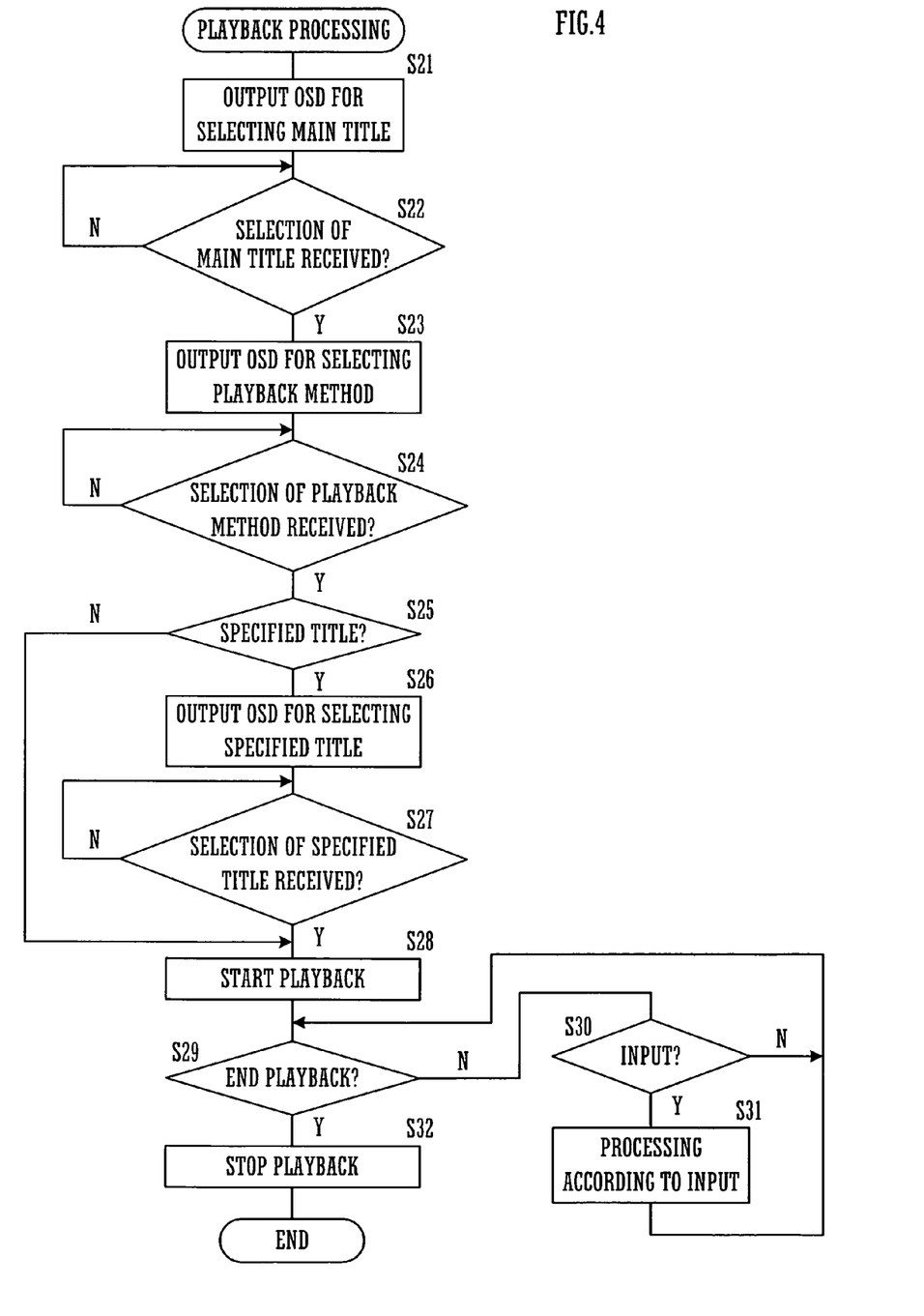
FIG. 4 is a flowchart showing playback processing in a record/playback apparatus according to an embodiment of the present invention.
Figure 5A:
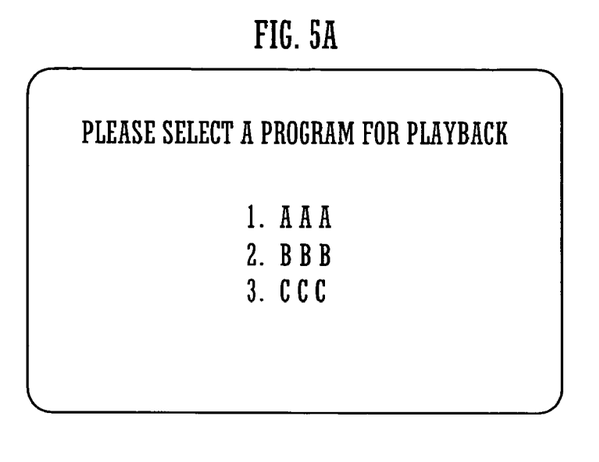
FIGS. 5A to 5C show OSD graphics output during playback in a record/playback apparatus according to an embodiment of the present invention.
Figure 5B:
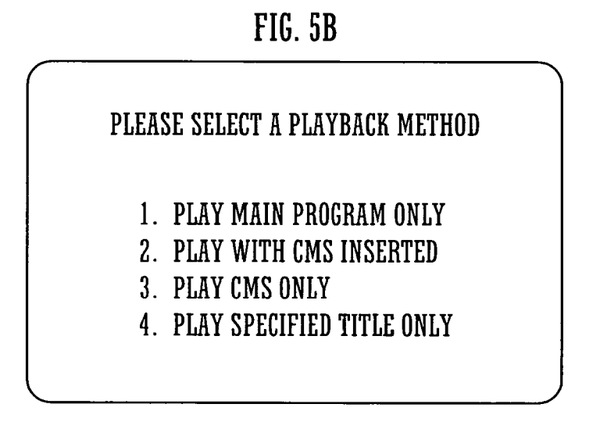

Playback processing in the record/playback apparatus 1 of the present embodiment is described next. FIG. 4 is a flowchart showing playback processing in the record/playback apparatus 1 of the present embodiment. As noted above, the record/playback apparatus 1 of the present embodiment, in a recording sequence, divides the main program and CMs inserted in the program into a plurality of titles and records the titles to the DVD 10. Also, the main title is included in the title names of the plurality of titles in this recording sequence. Using the OSD function, the record/playback apparatus 1 outputs the OSD graphics shown in FIG. 5A urging the user to input selection of the main title of a program for playback to the display apparatus connected to the output unit 5 (S21), and waits for a main title to be selected (S22). FIG. 5A illustrates a case in which three programs are recorded on the DVD 10 under the main titles "AAA", "BBB", and "CCC". The user inputs selection of a main title for playback by operating the numeric keypad of the remote control apparatus, for example. The record/playback apparatus 1, on receiving the selection of the main title of a program for playback at S22, outputs OSD graphics (see FIG. 5B) urging the user to input selection of a playback method (S23), and waits for selection of a playback method to be input (S24). The record/playback apparatus 1 can perform the following four types of playback:

(1) Play main program only (CMs skipped during playback)
(2) Play with CMs inserted in main program (same playback format as television broadcast)
(3) Play CMs only (main program skipped during playback)
(4) Play specified title only The user is able to freely select the playback method. The user selects a playback method by operating the numeric keypad of the remote control apparatus, for example.

Figure 5C:
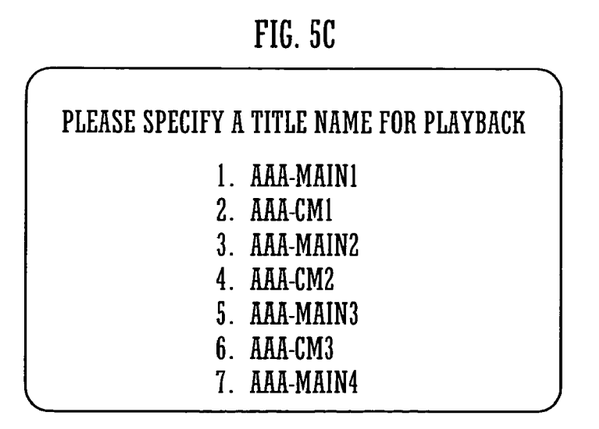

The record/playback apparatus 1, on receiving the selection of a playback method at S24, judges whether the selected playback method is playback of a specified title (S25). The record/playback apparatus 1, having judged at S25 that the selected playback method is playback of a specified title, outputs title selection OSD graphics (see FIG. 5C) for receiving specification of a title for playback (S26), and waits for selection of a title for playback to be input (S27). At S27, the record/playback apparatus 1 receives specification of one of the differentiated titles for playback out of the program sequence recorded under the main title selected at S22. FIG. 5C illustrates an example in which the main title "AAA" shown in FIGS. 2A and 2B is selected at S22.

If it is judged at S25 that the selected playback method is not playback of a specified title, or if a title for playback is specified at S27, the record/playback apparatus 1 starts playback (S28). At S28, playback according to the playback method selected from the above (1) to (4) is performed. For example, in the case where the above (1) "play main program only" is selected as the playback method with playback of the main title "AAA" shown in FIG. 2 having been selected, the record/playback apparatus 1 starts processing for continuously playing in order "AAA-main1", "AAA-main2", "AAA-main3", and "AAA-main4" recorded on the DVD 10. Again, in the case where the above (2) "play with CMs inserted in main program" is selected as the playback method, the record/playback apparatus 1 starts processing for continuously playing in order "AAA-main1", "AAA-CM1", "AAA-main2", "AAA-CM2", "AAA-main3", "AAA-CM3", and "AAA-main4" recorded on the DVD 10. If the above (3) "play CMs only" is selected as the playback method, the record/playback apparatus 1 starts processing for continuously playing in order "AAA-CM1", "AAA-CM2", and "AAA-CM3" recorded on the DVD 10. Further, if the above (4) "play specified title only" is selected as the playback method, the record/playback apparatus 1 starts processing for playing only the title selected at S27, being "AAA-main1", for example.

The record/playback apparatus 1, having started playback at S28, waits until the playback end timing has arrived (S29), or waits for an input (S30). The record/playback apparatus 1, on receiving an input, performs processing according to the received input (S31). For example, if the input relates to pausing playback, the record/playback apparatus 1 temporarily stops playback of the program at S31. Again, if the input relates to rewinding or fast-forwarding, the record/playback apparatus 1 executes rewinding or fast-forwarding at S31 according to the input. The record/playback apparatus 1, having judged that the playback end timing has arrived, ends playback of the program recorded on the DVD 10 (S32), and ends the processing.

In this way, the record/playback apparatus 1 of the present embodiment is able to play just the main program of a program recorded on the DVD 10, or play the main program with the CMs inserted therein, or alternatively play just the CMs. Consequently, it is also possible to increase the opportunities for making users watch CMs without reducing usability, and to thus get a greater number of users to watch CMs. Moreover, when the user only wants to watch the CMs inserted in the main program for a change, he or she is able to continuously play and watch just the CMs inserted in the main program, thereby enabling usability to be further improved.

Note that although the present invention is described in the foregoing embodiment using the example of a record/playback apparatus 1 that records televised programs to the DVD 10, the present invention can also be applied in a record/playback apparatus 1 that records programs to HD. With HD, the areas for recording a single title need not be consecutive, thereby making it possible, in recording a program sequence, to record "AAA-main1", "AAA-main2", "AAA-main3", and "AAA-main4" under a single title name "AAA-main", for example, in the case of the program shown in FIGS. 2A and 2B. Similarly, "AAA-CM1", "AAA-CM2", and "AAA-CM3" can also be recorded under a single title name "AAA-CM".

Finally, the description of the foregoing embodiment is in all respects illustrative and not limiting. The scope of the invention is indicated by the scope of the claims rather than by the foregoing embodiment. Further, all changes that come within the meaning and range of equivalency of the claims are intended to be embraced in the scope of the invention.

What is claimed is:

1. A record/playback apparatus comprising:
   a receiving unit that receives a televised program;
   a recording unit that records the program being received by the receiving unit to a disk;
   a commercial message detecting unit that detects a switch from a main program to commercial message and a switch from commercial message to the main program when the recording unit is recording the program; and
   a playback unit that plays the program recorded on the disk, the playback unit configured to perform a playback method of continuously playing only the main program, a playback method of playing the main program with multiple commercial messages inserted in the main program, and a playback method of continuously playing only the multiple commercial message,
   wherein the recording unit records:
      the main program and the multiple commercial messages to the disk under separate title names;
      temporally consecutive commercial messages among the multiple commercial messages to the disk under the same title name; and
      the main program and the multiple commercial messages to the disk under related title names, based on a result of the detection by the commercial message detecting unit, and
   wherein the record/playback apparatus further comprises:
      a selection unit that selects, in response to an input, whether the playback unit performs the playback method of continuously playing only the main program, the playback method of playing the main program with the multiple commercial messages inserted therein, or the playback method of continuously playing only the multiple commercial messages; and
      an output unit connected to a display apparatus which displays the main program and the multiple commercial messages played by the playback unit, the output unit outputting to the display apparatus on screen display graphics requesting an input that indicates the selection of the playback method by the selection unit.

* * * * *